(12) United States Patent  
Wang (10) Patent No.: US 7,975,563 B2  
(45) Date of Patent: Jul. 12, 2011

(54) SERVO POSITION/STRESS DETECTION CONTROL SYSTEM

(76) Inventor: Wen-Liang Wang, Kaohsiung (TW)

( * ) Notice: Subject to any disclaimer, the term of this patent is extended or adjusted under 35 U.S.C. 154(b) by 203 days.

(21) Appl. No.: 12/418,441

(22) Filed: Apr. 3, 2009

(65) Prior Publication Data

US 2009/0255347 A1      Oct. 15, 2009

(30) Foreign Application Priority Data

Apr. 10, 2008   (TW) .............................. 97112930 A (51) Int. Cl.
*G01D 9/00* (2006.01)

(52) U.S. Cl. ........................................ 73/862.51; 73/760

(58) Field of Classification Search .................... 73/760, 73/862, 862.51; 7/862
See application file for complete search history.

(56) References Cited

U.S. PATENT DOCUMENTS

| | | | | |
|---|---|---|---|---|
| 4,524,313 A | * | 6/1985 | Kuno et al. ................... | 318/563 |
| 4,988,945 A | * | 1/1991 | Nagase ......................... | 324/175 |
| 6,057,661 A | * | 5/2000 | Iwashita ........................ | 318/563 |
| 6,122,998 A | * | 9/2000 | Iwashita ........................ | 82/1.11 |
| 6,250,420 B1 | * | 6/2001 | Brenner et al. ............... | 180/443 |
| 6,434,454 B1 | * | 8/2002 | Suzuki ........................... | 701/29 |
| 7,315,772 B2 | * | 1/2008 | Tsutsumi et al. .............. | 701/41 |

* cited by examiner

*Primary Examiner* — Max Noori  
(74) *Attorney, Agent, or Firm* — patenttm.us (57) ABSTRACT

A servo position/stress detection control system has a servomotor, a servo driver and a controller. The servo driver has a control unit, an absolute angle reading unit and a register. The control unit selectively drives or stops the servomotor and converts torque value of the servomotor to a force value. The absolute angle reading unit reads an absolute angle value of rotation in response to a spindle of the servomotor. The controller respectively converts the absolute angle value and the force value to a linear displacement and a load stress value with a calculating program, establishes a load line in response to different force values and corresponding linear displacements wherein the load line provides corresponding correction basis for the servo driver to automatically detect height variances caused by reacting force and accordingly adjust working status of the servomotor.

3 Claims, 11 Drawing Sheets

SERVO POSITION/STRESS DETECTION CONTROL SYSTEM

BACKGROUND OF THE INVENTION

1. Field of the Invention

The present invention relates to a servo detection control system, especially to a servo position/stress detection control system that provides position and/or stress control of high precision.

2. Description of the Related Art

Driving mechanism of a conventional precision machine may be combined with displacement or force detecting devices for making the precision machine meet the requirement of expected precision.

Foregoing displacement detecting device may be a linear optical scale wherein the optical scale applies moire method by making lights pass through condensing lens, a first graduated scale, a second graduated scale and a light detector to bring moire fringe effect on the light detector. Light signal may be amplified and be converted into a displacement signal and send back to a control device of the precision machine for measurement.

The displacement detecting device using linear optical scale can present variances of lengths or angles in digital type and quickly reads the variances to avoid interpretation error of human operation. However, design of the optical scale can hardly achieve a zero degree angle between gratings of the first and second graduated scales optical scale. Therefore during light transmission and signal amplification, precision degree achieved by the machine operation still do not meet requirements.

With regard to the force detecting device, it detects output force of a precision machine exerting on a load for correcting the output force of the precision machine before using the precision machine and proceeding actual workpiece machining. However the force detecting device may be easily affected by mechanical equipment and cannot actually and precisely measure the force exerting on workpiece. Therefore precision of machine operation still do not meet requirements.

Furthermore, an electronic press machine is a precision machine using a linear shifting device that drives a molding fixture to press-fit workpieces. The displacement of movement and stress control must be precisely controlled so as to achieve requirements of product quality. Present technique for designing Conventional precision machine produced by present technique can produce products having certain machining precision. Only when the linear shifting device exerting different pressure on workpiece using a press member, press member or workpiece being pressed may have variance of height due to reacting forces and cause the output force and device position cannot be actually reflected and cannot achieve great precision of position.

To overcome the shortcomings, the present invention provides a servo position/stress detection control system to mitigate or obviate the aforementioned problems.

SUMMARY OF THE INVENTION

The main objective of the invention is to provide a servo position/stress detection control system that provides position and/or stress control of high precision.

The servo position/stress detection control system in accordance with the present invention comprising a servomotor, a servo driver and a controller.

The servomotor has a rotation force output unit and an encoder. The rotation force output unit has a spindle. The encoder is connected to the spindle of the rotation force output unit. The servo driver has a control unit, an absolute angle reading unit and a register. The control unit is electrically connected to the servomotor, selectively drives or stops the servomotor and converts torque value of the servomotor to a force value. The absolute angle reading unit is mounted aside the encoder and reads an absolute angle value of rotation from the spindle. The register is electrically connected to the control unit and the absolute angle reading unit and stores the absolute angle value and the force value.

The controller has an operating unit. The operating unit has a calculating program, is electrically connected to the register, accesses the absolute angle value and the force value stored in the register, converts the absolute angle value to a linear displacement with the calculating program, converts the force value to a load stress value with the calculating program, establishes a load line in response to different force values and corresponding linear displacements wherein the load line provides corresponding correction basis for the servo driver to automatically detect height variances caused by reacting force and accordingly adjust working status of the servomotor.

With foregoing system, the control unit of the servo driver drives the servomotor with electricity, the servomotor then pushes the driving shaft moving downward and pressing the workpiece. The operating unit of the controller accesses the feedback torque value from the servomotor to obtain the height and force value of the driving shaft. The servo driver then adjust the pressure exerted on the workpiece according to the load line to exclude possible errors caused by the stress and variance of height of the driving shaft to truly reflect exact pressure and position and then enhance the machining precision of workpiece.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
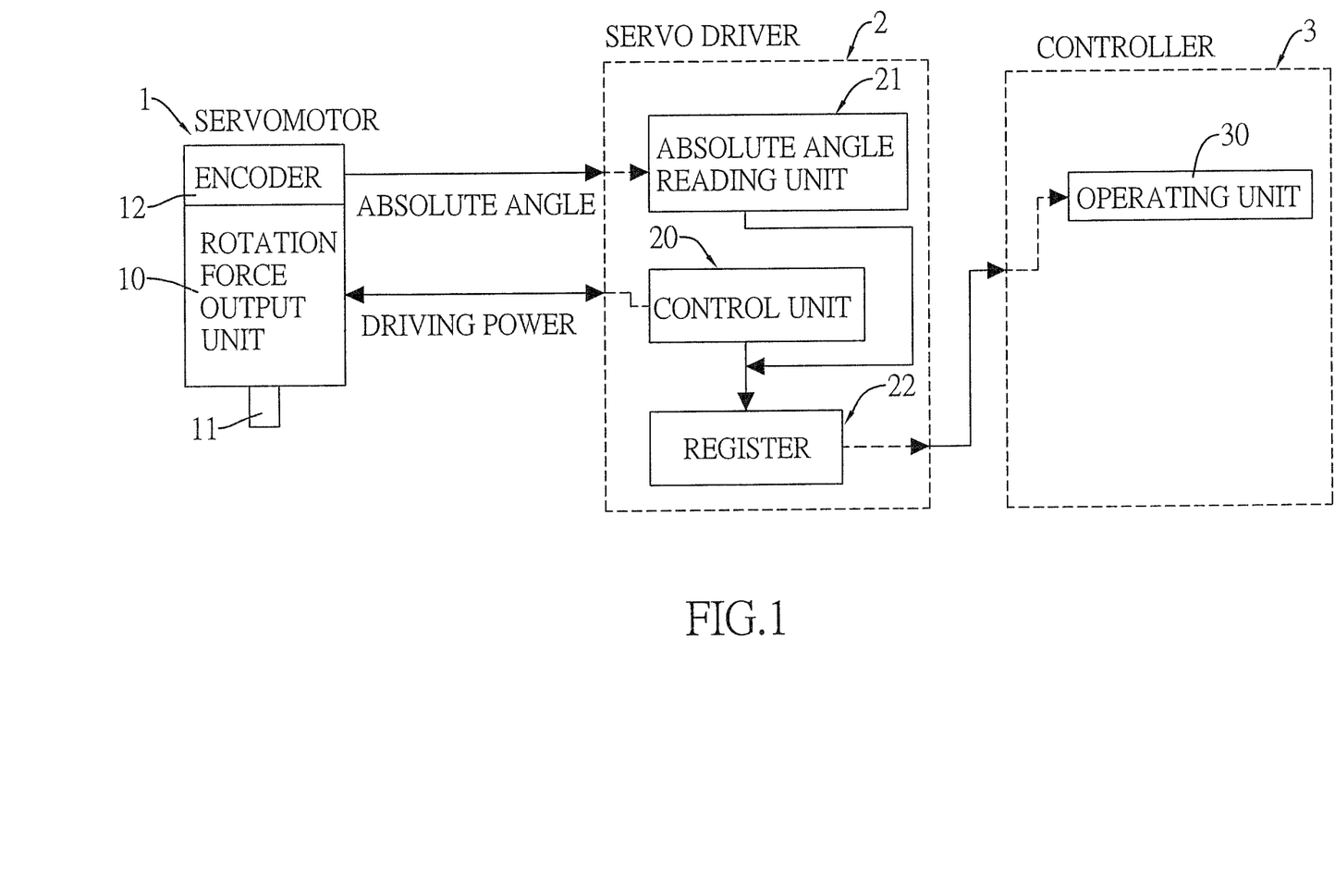
FIG. 1 is a schematic block diagram of a servo position detection control system in accordance with the present invention.
Figure 2:
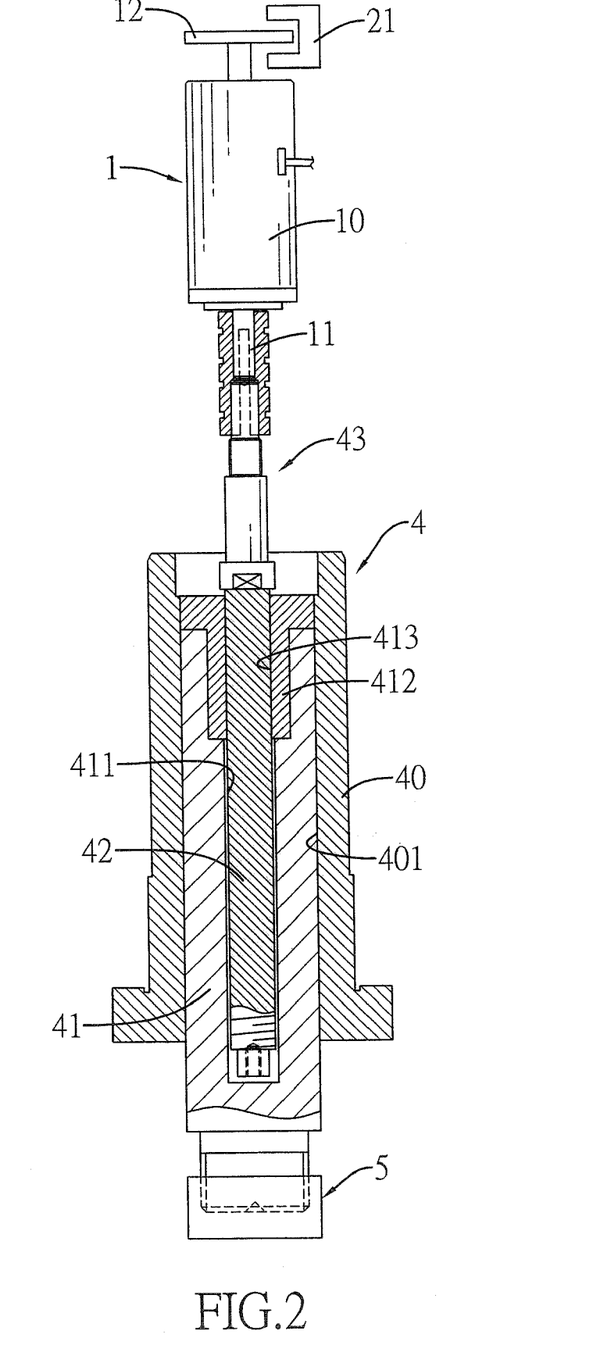
FIG. 2 is a cross sectional side view of the servo position detection control system integrated with a linear shifting device and a press member to be an electronic press machine.

The present invention may comprise a servo position detection control system and a servo stress detection system. With reference to FIGS. 1 and 2, a servo position detection control system in accordance with the present invention comprises a servomotor (1), a servo driver (2) and a controller (3). The servo driver (2) and the controller (3) may further integrated into a control device or a computer.

The servomotor (1) is a controllable device that outputs rotation force. The servomotor (1) has a rotation force output unit (10) and an encoder (12). The rotation force output unit (10) has a spindle (11). The encoder (12) is connected to the spindle (11) and rotates with the spindle (11).

The servo driver (2) has a control unit (20), an absolute angle reading unit (21) and a register (22). The control unit (20) is connected to the servomotor (1) via a power-connecting interface and selectively drives or stops the servomotor (1). The absolute angle reading unit (21) is mounted aside the encoder (12) to read an absolute angle value of rotation of the spindle (11). The register (22) is electrically connected to the control unit (20) and the absolute angle reading unit (21) and stores the absolute angle value.

The controller (3) is electrically connected to the servo driver (2) and has an operating unit (30). The operating unit (30) has a calculating program. The calculating program has a function for converting absolute angle value to a linear displacement. The operating unit (30) is electrically connected to the register (22) via a signal-transmitting interface, receives the absolute angle value stored in the register (22) and converts the absolute angle value to a linear displacement with the calculating program. The signal-transmitting interface may be a RS-485 communication interface or other similar communication interface.

With reference to FIG. 2, the servo position detection control system is integrated with a linear shifting device (4) and a press member (5) to be an electronic press machine. The linear shifting device (4) has a body (40), a driving shaft (41) and a screw member (42). The body (40) has an axis hole (401). The driving shaft (41) is mounting movably in the axis hole (401) and has a mid hole (411) and a fastener (412). The fastener (412) is mounted in the mid hole (411) and has a screw hole (413). The screw member (42) is mounted through the screw hole (413) of the fastener (412) in the driving shaft (41), has a top end and a bottom end. The top end of the screw member (42) is connected to the spindle (11) of the servomotor (1) via a coupler (43). The press member (5) is connected to the bottom end of the screw member (42).

Figure 3:
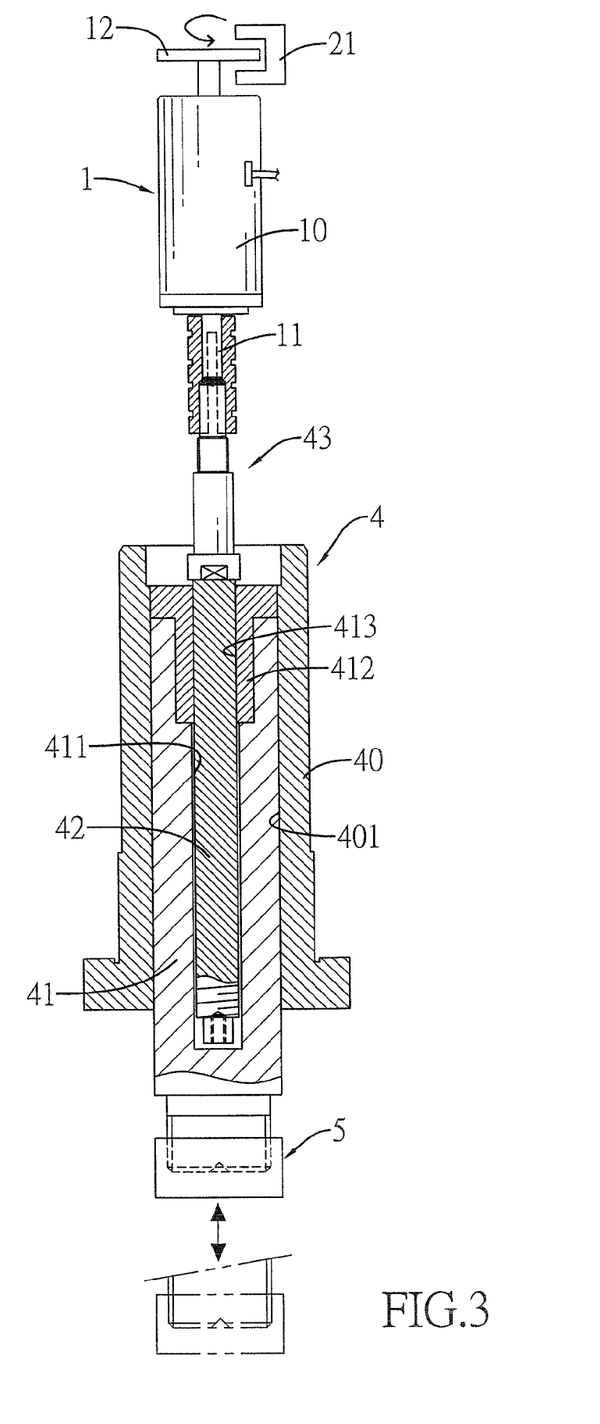
FIG. 3 is an operational cross sectional side view of the servo position detection control system integrated with a linear shifting device and a press member in FIG. 2.

With reference to FIGS. 1 to 3, when the servo position detection control system is operated with the linear shifting device (4), a user may drive the servomotor (1) with electric power via the control unit (20) of the servo driver (2). The servomotor (1) may rotate the screw member (42) of the linear shifting device via the spindle (11). The driving shaft (41) mounted movably around the screw member (42) then turns the rotation into linear movement and moves downward with the press member (5). Furthermore, the absolute angle reading unit (21) of the servo position detection control system reads an absolute angle value of the encoder (12) aside the spindle (11) and sends the absolute angle value to the register (22). The controller (3) then receives the absolute angle value via the signal-transmitting interface and converts the absolute angle value to a linear displacement with the calculating program. Therefore when the linear shifting device (4) applies a press force to a device during operation, the servo position detection control system can obtain exact value of linear displacement of the press member (5) and send the value back to a control mechanism of the press machine to inform the control mechanism about the actual operation to achieve requirement of great precision.

Figure 4:
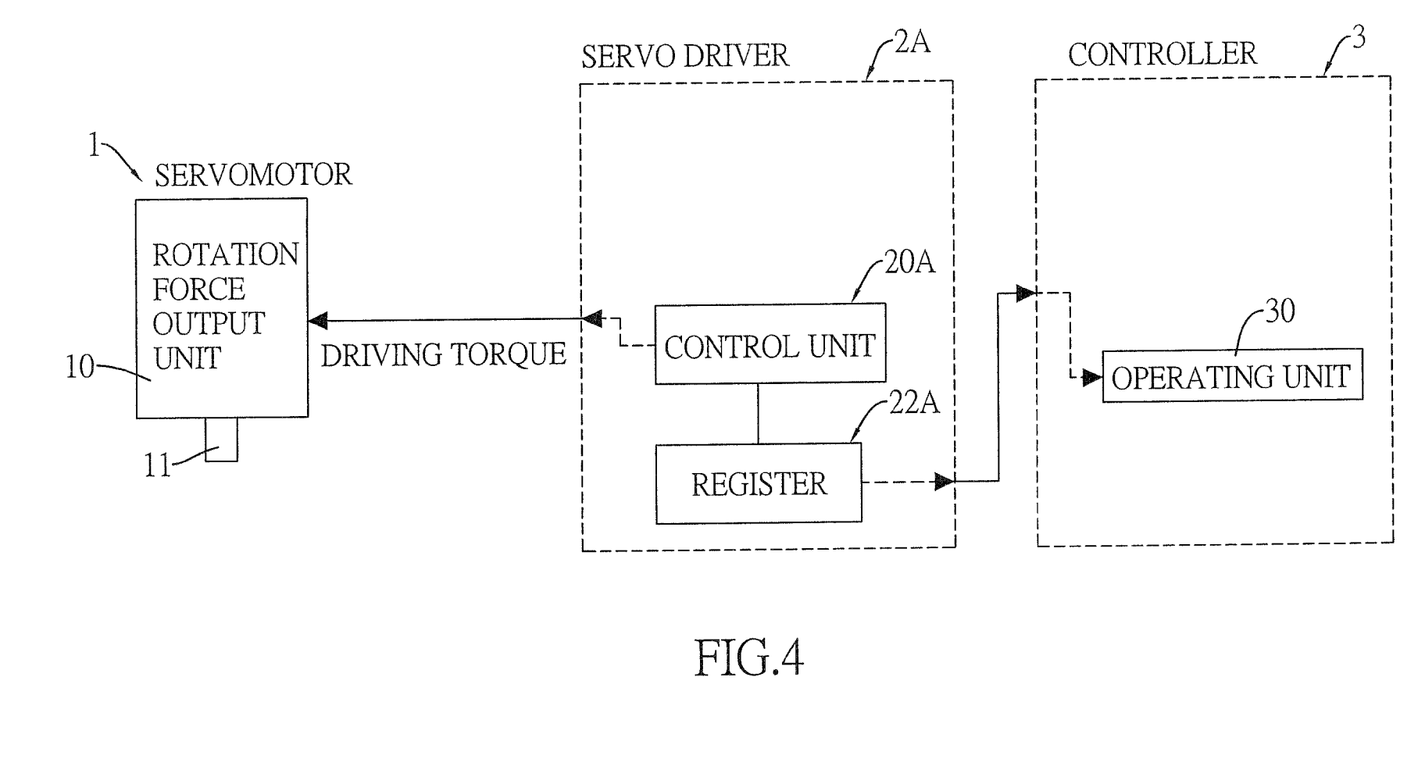
FIG. 4 is a schematic block diagram of a servo stress detection control system in accordance with the present invention.
Figure 5:
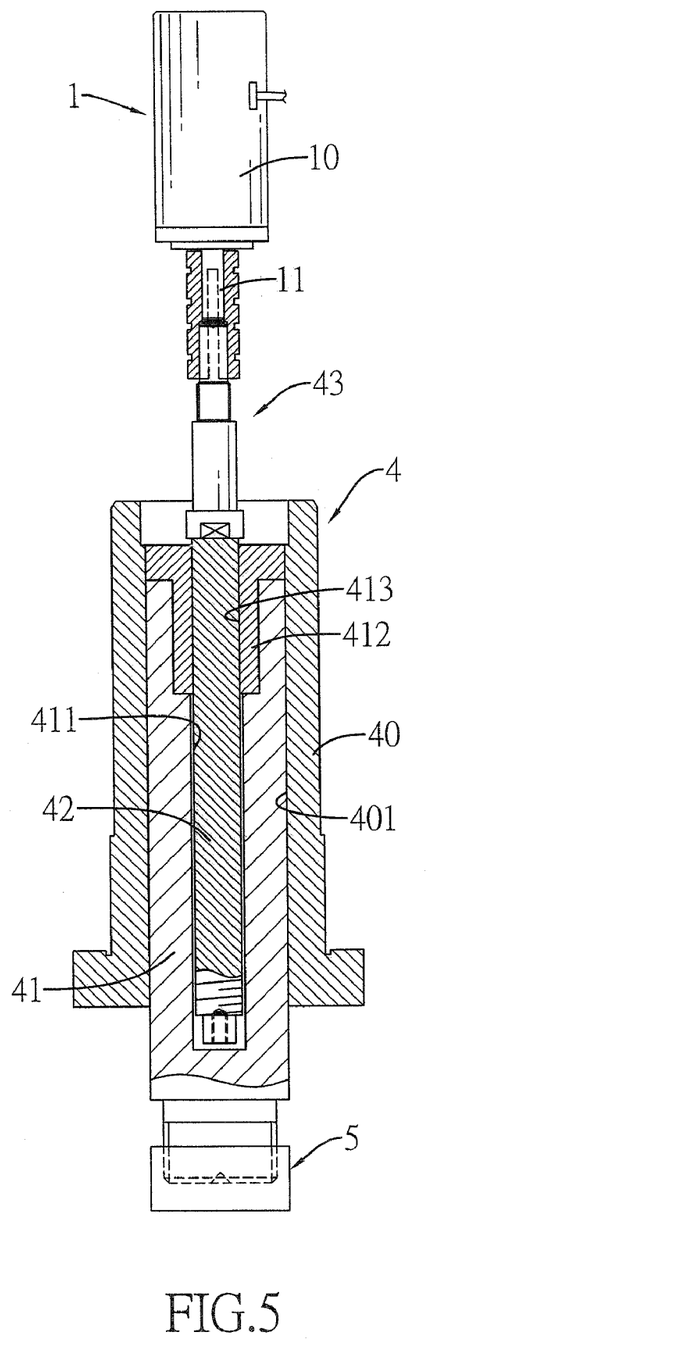
FIG. 5 is a cross sectional side view of the servo stress detection control system integrated with a linear shifting device and a press member to be an electronic press machine.

With reference to FIGS. 4 and 5, a preferred embodiment of a servo stress detection control system in accordance with the present invention comprises a servomotor (1), a servo driver (2A) and a controller (3).

The servomotor (1) has a rotation force output unit (10) having a spindle (11).

The servo driver (2A) has a control unit (20A) and a register (22A). The register (22A) is connected to the control unit (20A). The control unit (20A) may drive the servomotor (1) with electric power, convert torque value of the servomotor to a force value and send the force value to the register (22A).

The controller (3) is connected to the servo driver (2A) and has an operating unit (30). The operating unit (30) is electrically connected to the register (22A) via a signal-transmitting interface to access the force value stored in the register (22A) and has a calculating program that converts force value to a load stress value. The signal-transmitting interface may be an RS-485 communication interface or other similar communication interface.

With reference to FIG. 5, the servo position detection control system is integrated with a linear shifting device (4) and a press member (5) to be a press machine. The structure of the linear shifting device (4) is the same with foregoing one in FIG. 2.

Figure 6:
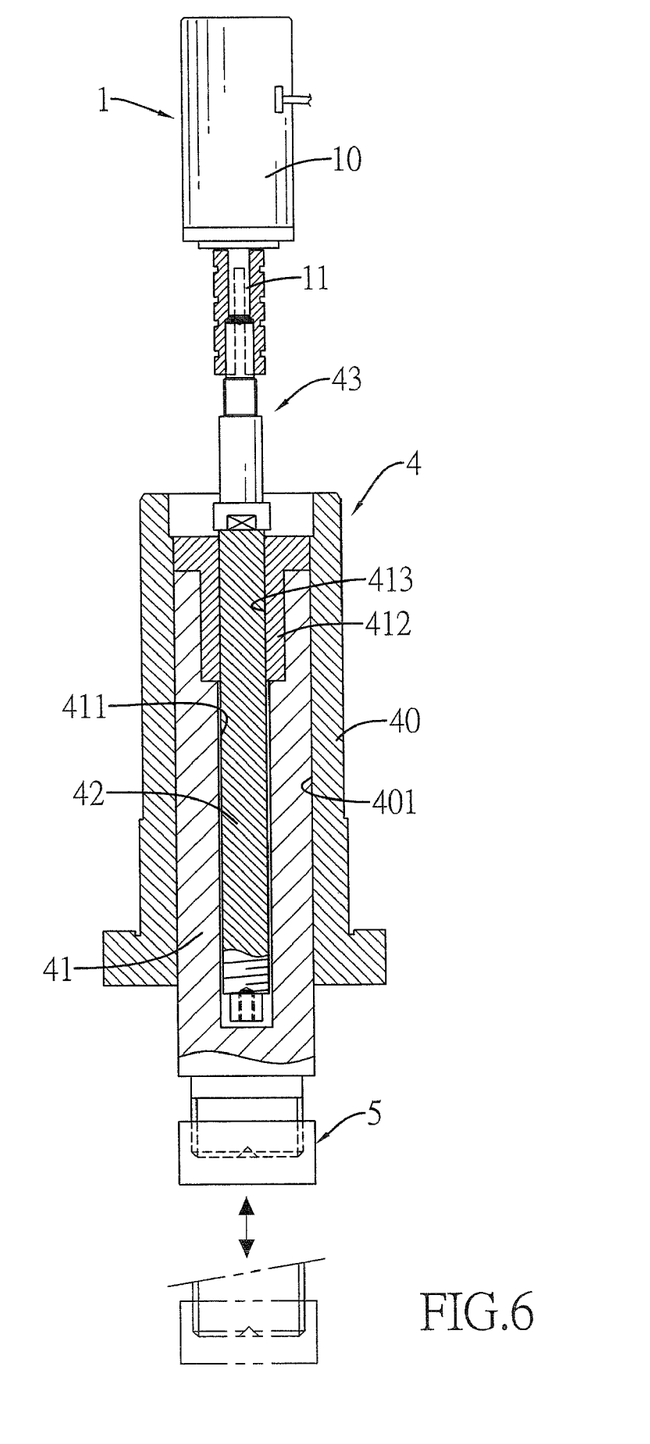
FIG. 6 is an operational cross sectional side view of the servo stress detection control system integrated with a linear shifting device and a press member in FIG. 5.

When the servo stress detection control system is operated with the linear shifting device (4) as shown in FIGS. 4 to 6, the user can drive the servomotor (1) with electric power via the control unit (20A) of the servo driver (2A). The servomotor (1) may rotate the screw member (42) of the linear shifting device via the spindle (11). The driving shaft (41) mounted movably around the screw member (42) then turns the rotation into linear movement and moves downward with the press member (5). Furthermore, the control unit (20A) of the servo stress detection control system obtains a torque value of the servomotor (1) and converts the torque value of the servomotor (1) to a force value and sends the force value to the register (22A). The controller (3) then receives the force value via the signal-transmitting interface and converts the force value to a load stress value with the calculating program. Therefore when the linear shifting device (4) provides a press force to a device during operation, the servo stress detection control system can obtain exact value of load stress value of the press member (5) and send the value back to a control mechanism of the press machine to inform the control mechanism about the actual operation to achieve requirement of great precision.

Figure 7:
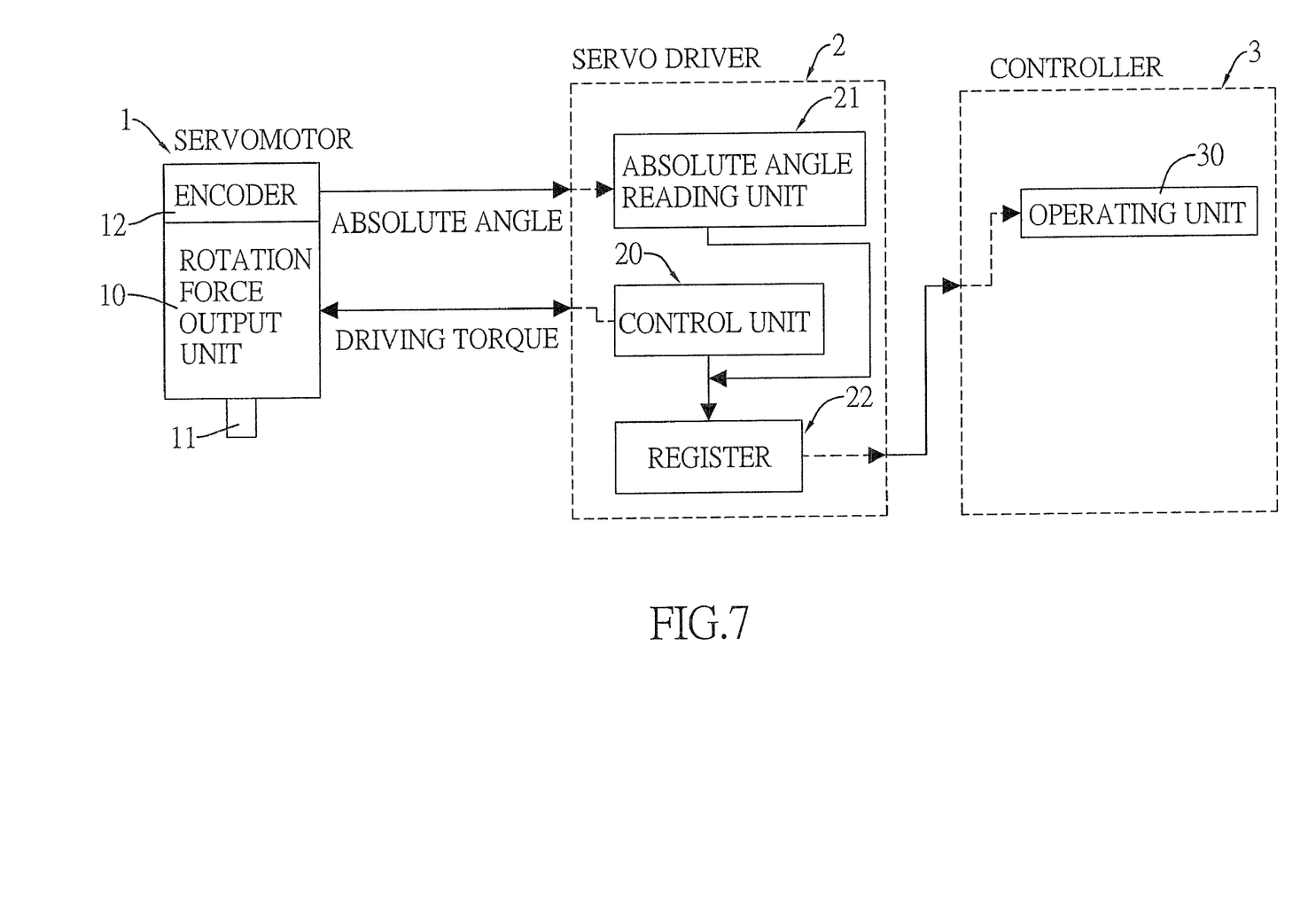
FIG. 7 is a schematic block diagram of a servo position/stress detection control system in accordance with the present invention.
Figure 8:
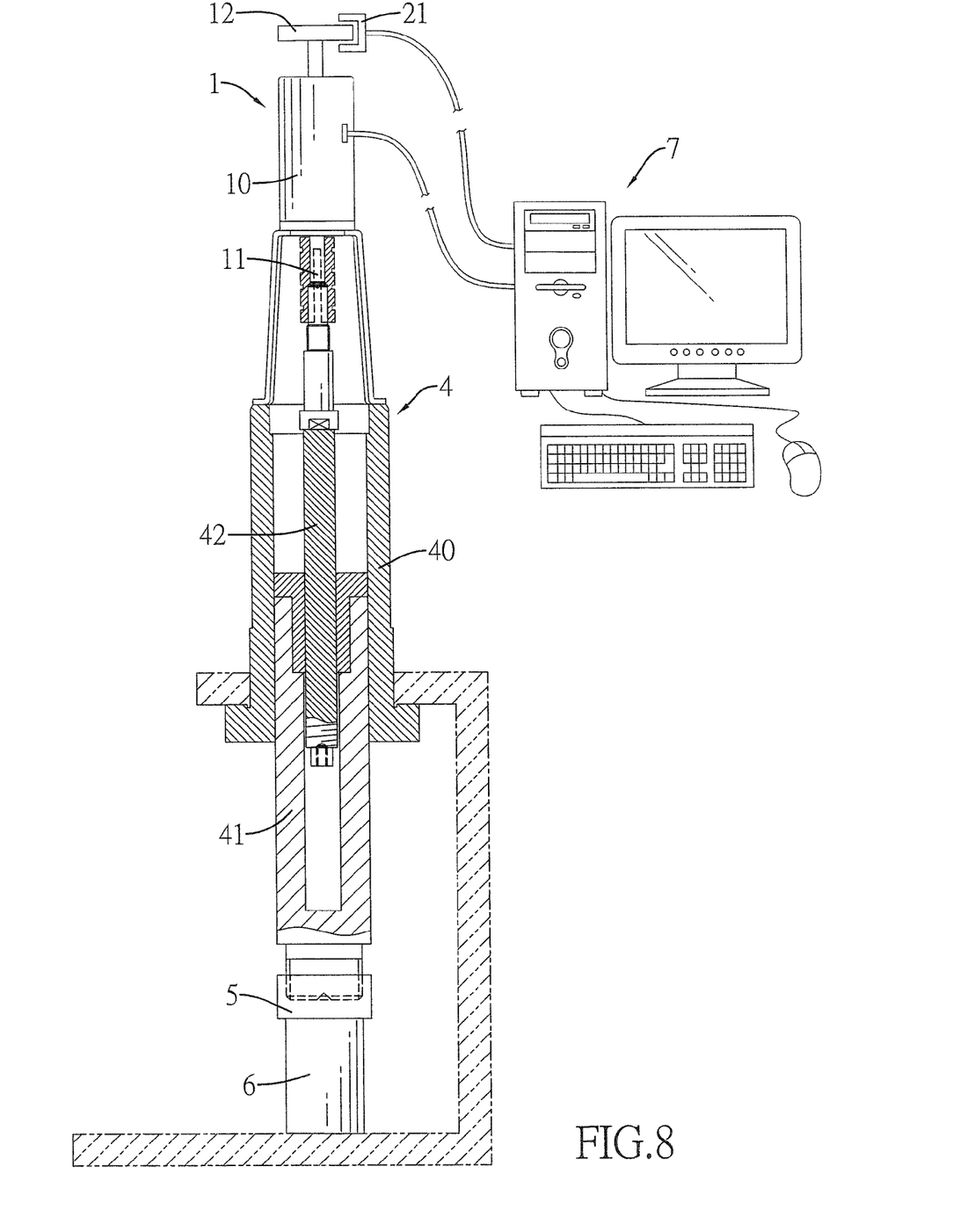
FIG. 8 is an operational cross sectional side view of the servo position/stress detection control system applied in an electronic press machine.
Figure 9:
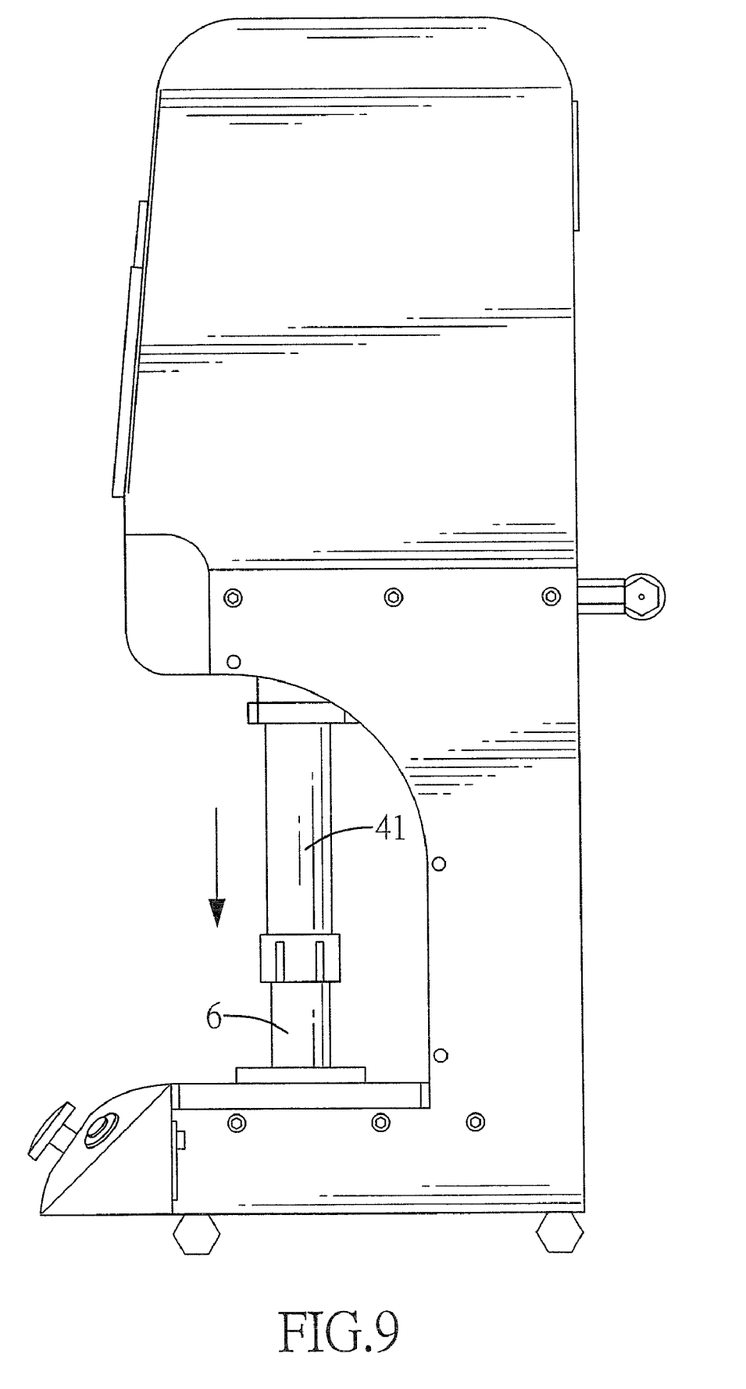
FIG. 9 is a side view of the electronic press machine in FIG. 8.
Figure 10:
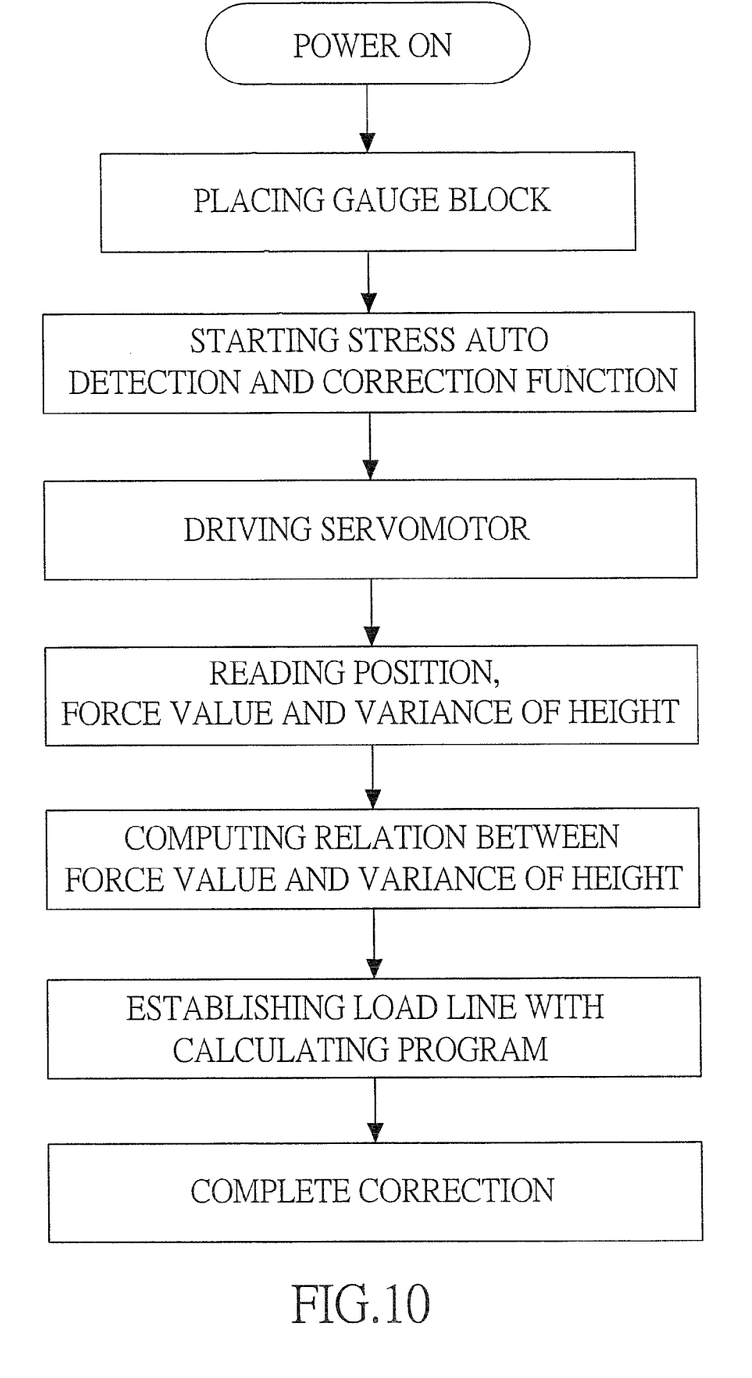
FIG. 10 is a flow chart of automatic detection and correction process of the servo position/stress detection control system in accordance with the present invention.
Figure 11:
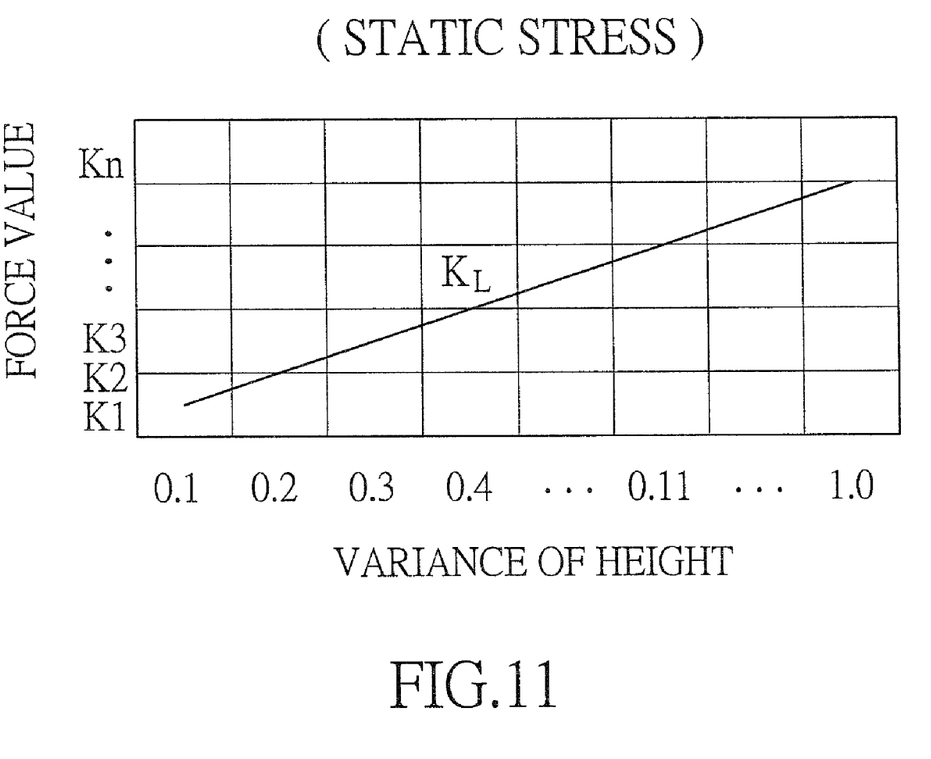
FIG. 11 is a curve diagram of a load line showing the relation between force value and variance of height established from the servo position/stress detection control system.

With farther reference to FIG. 7, a preferred embodiment of a servo position/stress detection control system is disclosed to reflect actual and precise values of stress and position to enhance the precision of manufacture process The assembly of servo position/stress detection control system is similar with foregoing servo position detection control system shown in FIG. 1. The difference is that the control unit (20) of the servo driver (2) may not only drive the servomotor (1) with electric power but also further provide torque value of the servomotor (1) to the register (22). The controller (3) and the servo driver (2) may be integrated into a computer (7) (as shown in FIG. 8) or a control device. With reference to FIGS. 8, 9 and 10, when the servo position/stress detection control system is applied to aforementioned electronic press machine, a standard fixture (6) is placed under the driving shaft (41) for the press member (5) at the bottom end of the screw member (42) to press on surface of the standard fixture (6). Preferably the standard fixture (6) is a gauge block made of hard material. During operation, the servo driver (2) uses the control unit (20) to obtain torque value of the driving shaft (41) drove by the driving servomotor (1) and convert the torque value to a force value. The operating unit (30) of the controller (3) then accordingly computes a load stress value according to the force value with the calculating program. The operating unit (30) further accesses the linear displacement of the driving shaft (41) by converting the absolute angle value stored in the register (22) with the calculating program. When the servomotor (1) drives the press member (5) to press the standard fixture (6), variances of height of the driving shaft (41) due to different reacting forces are detected by the control unit (20) and stored in the register (22). The operating unit (30) of the controller (3) then establishes a load line ($K_L$) (as shown in FIG. 11) according to the variances of height of the driving shaft (41). The load line ($K_L$) presents different force values and corresponding variances of height of the driving shaft (41). The load line ($K_L$) provides corresponding correction basis for the servo driver (2) to automatically adjust the load pressure exerted by the linear shifting device (4) due to the variance of the height caused by different force values.

Therefore, during precision machining of workpiece, the control unit (20) of the servo driver (2) drives the servomotor (1) with electricity, the servomotor (1) then pushes the driving shaft (41) moving downward and pressing the workpiece. The operating unit (30) of the controller (3) accesses the feedback torque value from the servomotor (1) to obtain the height and force value of the driving shaft (41). The servo driver (3) then adjust the pressure exerted on the workpiece according to the load line ($K_L$) to exclude possible errors caused by the stress and variance of height of the driving shaft (41) to truly reflect exact pressure and position and then enhance the machining precision of workpiece.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A servo stress detection control system comprising:
    a servomotor having a rotation force output unit having a spindle;
    a servo driver having
        a control unit being electrically connected to the servomotor, selectively driving or stopping the servomotor and converting a torque value of the servomotor to a force value; and
        a register being electrically connected to the control unit and storing the force value; and
    a controller having
        an operating unit having a calculating program, being electrically connected to the register, accessing the force value stored in the register and converting the force value to a load stress value with the calculating program, the load stress value being used as feedback information for controlling the servomotor.

2. A servo position/stress detection control system comprising:
    a servomotor having
        a rotation force output unit having a spindle; and
        an encoder being connected to the spindle of the rotation force output unit;
    a servo driver having
        a control unit being electrically connected to the servomotor, selectively driving or stopping the servomotor and converting torque value of the servomotor to a force value;
        an absolute angle reading unit being mounted aside the encoder and reading an absolute angle value in response to rotation of the spindle; and
        a register being electrically connected to the control unit and the absolute angle reading unit and storing the absolute angle value and the force value; and
    a controller having
        an operating unit having a calculating program, being electrically connected to the register, accessing the absolute angle value and the force value stored in the register, converting the absolute angle value to a linear displacement with the calculating program, converting the force value to a load stress value with the calculating program, establishing a load line in response to different force values of the servomotor and corresponding linear displacements wherein the load line provides corresponding correction basis for the servo driver to automatically detect height variances caused by reacting force and accordingly adjust working status of the servomotor.

3. The servo position/stress detection control system as claimed in claim 2, wherein the absolute angle reading unit is a photoelectric sensor.

* * * * *